(12) United States Patent
Pogén

(10) Patent No.: US 12,535,023 B2
(45) Date of Patent: Jan. 27, 2026

(54) CENTRIFUGAL SEPARATOR FOR CLEANING GAS

(71) Applicant: Alfdex AB, Landskrona (SE)

(72) Inventor: Mats-Örjan Pogén, Billeberga (SE)

(73) Assignee: ALFDEX AB, Landskrona (SE)

( * ) Notice: Subject to any disclaimer, the term of this patent is extended or adjusted under 35 U.S.C. 154(b) by 346 days.

(21) Appl. No.: 18/285,319

(22) PCT Filed: Mar. 22, 2022

(86) PCT No.: PCT/EP2022/057521
§ 371 (c)(1),
(2) Date: Oct. 2, 2023

(87) PCT Pub. No.: WO2022/223222
PCT Pub. Date: Oct. 27, 2022

(65) Prior Publication Data
US 2024/0191642 A1    Jun. 13, 2024

(30) Foreign Application Priority Data

Apr. 19, 2021  (EP) ..................................... 21169199

(51) Int. Cl.
*B01D 53/22* (2006.01)
*B04B 5/12* (2006.01)
(Continued)

(52) U.S. Cl.
CPC ............... *F01M 13/04* (2013.01); *B04B 5/12* (2013.01); *B04B 7/04* (2013.01); *F01M 2013/0422* (2013.01)

(58) Field of Classification Search
CPC .. F01M 13/04; F01M 2013/0422; B04B 5/12; B04B 7/04
See application file for complete search history.

(56) References Cited

U.S. PATENT DOCUMENTS

| 2,114,778 A | 4/1938 | Fillinger |
| 7,713,185 B2 | 5/2010 | Baumann et al. |

(Continued)

FOREIGN PATENT DOCUMENTS

| EP | 4335551 A1 * | 3/2024 | ............... B04B 7/02 |
| WO | WO-2018036905 A1 * | 3/2018 | ............... B04B 5/12 |

OTHER PUBLICATIONS

International Search Report (PCT/ISA/210) issued in PCT/EP2022/057521, dated Jul. 19, 2022.
(Continued)

*Primary Examiner* — Anthony Shumate
(74) *Attorney, Agent, or Firm* — Birch, Stewart, Kolasch & Birch, LLP

(57) ABSTRACT

A centrifugal separator for cleaning gas containing contaminants includes a stationary casing, enclosing a separation space through which a gas flow is permitted, the stationary casing including a surrounding side wall, an upper end wall and a lower end wall; a gas inlet; a rotating member including a plurality of separation members; a gas outlet; a drainage outlet; a drive member for rotating the rotating member; at least one guiding vane arranged for guiding separated liquid impurities on the inner surface of the lower end wall from a radial outer position to the drainage outlet; and a radial disc element arranged on top of the at least one guiding vane. The radial disc element extends radially in the separation space to a position radially inwards from the surrounding side wall, thereby forming an annular channel for separated liquid impurities at the inner surface of the surrounding side wall.

20 Claims, 3 Drawing Sheets

(51) Int. Cl.
*B04B 7/04* (2006.01)
*F01M 13/04* (2006.01)

(56) References Cited

U.S. PATENT DOCUMENTS

| | | | |
|---|---|---|---|
| 8,657,908 B2 | 2/2014 | Eliasson | |
| 2009/0000258 A1* | 1/2009 | Carlsson | B04B 11/02 |
| | | | 55/400 |
| 2012/0174540 A1* | 7/2012 | Tornblom | B04B 5/12 |
| | | | 55/409 |
| 2012/0174541 A1* | 7/2012 | Tornblom | F01M 13/04 |
| | | | 55/409 |
| 2012/0174542 A1* | 7/2012 | Tornblom | F01M 13/04 |
| | | | 55/409 |
| 2012/0174543 A1* | 7/2012 | Tornblom | F01M 13/04 |
| | | | 55/434.1 |
| 2012/0174545 A1* | 7/2012 | Tornblom | B04B 9/12 |
| | | | 29/889 |
| 2012/0174546 A1* | 7/2012 | Tornblom | B01D 45/14 |
| | | | 55/461 |
| 2012/0174547 A1* | 7/2012 | Tornblom | F01M 13/04 |
| | | | 55/461 |
| 2017/0036221 A1* | 2/2017 | Eliasson | F01M 13/04 |
| 2019/0210039 A1* | 7/2019 | Kuhn | B04B 7/16 |
| 2020/0171420 A1 | 6/2020 | Holm et al. | |
| 2025/0214090 A1* | 7/2025 | Andersson Aginger | |
| | | | B04B 5/12 |

OTHER PUBLICATIONS

Written Opinion of the International Searching Authority (PCT/ISA/237) issued in PCT/EP2022/057521, dated Jul. 19, 2022.

* cited by examiner

CENTRIFUGAL SEPARATOR FOR CLEANING GAS

FIELD OF THE INVENTION

The present invention relates to the field of centrifugal separators for cleaning a gas containing liquid contaminants. In particular, the present invention relates to a separator for cleaning crankcase gases of a combustion engine from oil particles.

BACKGROUND OF THE INVENTION

It is well known that a mixture of fluids having different densities may be separated from one another through use of a centrifugal separator. One specific use of such a separator is in the separation of oil from gas vented from a crankcase forming part of an internal combustion engine.

With regard to this specific use of separators, there can be a tendency for the high-pressure gas found in the combustion chambers of an internal combustion engine to leak past the associated piston rings and into the crankcase of the engine. This continuous leaking of gas into the crankcase can lead to an undesirable increase of pressure within the crankcase and, as a consequence, to a need to vent gas from the casing. Such gas vented from the crankcase typically carries a quantity of engine oil (as droplets or a fine mist), which is picked up from the reservoir of oil held in the crankcase.

In order to allow vented gas to be introduced into the inlet system without also introducing unwanted oil (particularly into a turbocharging system wherein the efficiency of the compressor can be adversely affected by the presence of oil), it is necessary to clean the vented gas (i.e. to remove the oil carried by the gas) prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908.

In a crankcase centrifugal separator, it may be favourable to use plastic portions rather than e.g. steel or aluminium to reduce cost and weight of the separator. However, such a design also needs to carry the load of the rotating parts, which in turn is affected by the engine vibrations. Further, the heat of warm engine oil which may be used for propelling a turbine and thus the rotating portions of the separator, may further affect the stiffness of the plastic portions of the separator. Moreover, for crankcase centrifugal separators, separated liquid impurities, such as oil, may be difficult to drain from the separation space due to the circulating gas stream caused by the rotor.

Thus, there is a need in the art for a centrifugal separator for cleaning crankcase gas that comprises plastic portions but still has good properties in terms of stiffness and stability, which in turn provides for satisfying oil drainage from the separation space.

SUMMARY OF THE INVENTION

It is an object of the invention to at least partly overcome one or more limitations of the prior art. In particular, it is an object to provide a centrifugal separator having an increased stiffness and improved oil drainage from the separation space.

As a first aspect of the invention, there is provided a centrifugal separator for cleaning gas containing contaminants comprising
 a stationary casing enclosing a separation space through which a gas flow is permitted, said stationary casing comprising a surrounding side wall, an upper end wall and a lower end wall,
 a gas inlet extending through the stationary casing and permitting supply of the gas to be cleaned,
 a rotating member comprising a plurality of separation members arranged in said separation space and being arranged to rotate around an axis (X) of rotation;
 a gas outlet arranged in the stationary casing and configured to permit discharge of cleaned gas and comprising an outlet opening through a wall of the stationary casing,
 a drainage outlet arranged in a lower portion of the stationary casing and configured to permit discharge of liquid contaminants separated from the gas to be cleaned;
 a drive member for rotating the rotating member;
 wherein the centrifugal separator further comprises at least one guiding vane arranged for guiding separated liquid impurities on the inner surface of the lower end wall from a radial outer position to the drainage outlet;
 wherein the centrifugal separator further comprises a radial disc element arranged on top of the at least one guiding vane, wherein the radial disc element extends radially in the separation space to a position that is radially inwards from the surrounding side wall, thereby forming an annular channel for separated liquid impurities at the inner surface of the surrounding side wall.

As used herein, the term "axially" denotes a direction which is parallel to the rotational axis (X). Accordingly, relative terms such as "above", "upper", "top", "below", "lower", and "bottom" refer to relative positions along the rotational axis (X). Correspondingly, the term "radially" denotes a direction extending radially from the rotational axis (X). A "radially inner position" thus refers to a position closer to the rotational axis (X) compared to "a radially outer position".

The contaminants in the gas may comprise liquid contaminants, such as oil, and soot.

Consequently, the centrifugal separator may be for separating liquid contaminants, such as oil, from gas. The gas may be crankcase gas of a combustion engine. However, the centrifugal separator may also be suitable for cleaning gases from other sources, for instance the environment of machine tools which frequently contains large amounts of liquid contaminants in the form of oil droplets or oil mist.

The stationary casing of the centrifugal separator comprises a surrounding side wall, and first and second end walls, which enclose the separation space. The stationary casing may have a cylindrical shape with circular cross-section having a radius R from the axis (X) of rotation to the surrounding side wall. This radius R may be constant at least with respect to a major part of the circumference of the surrounding side wall. The first and second end walls form the upper end wall and the lower end wall of the cylindrical shaped casing. The stationary casing may also be slightly conical. The stationary casing may comprise more than one layer, such as an outer or inner layer. The innermost surface of the stationary casing may thus be what defines the radial and/or axial boundary of the separation space. The stationary casing may two portions, a first portion forming the upper end wall and an upper portion of the surrounding side wall, and a second portion forming the lower end wall and the lower portion of the surrounding side wall.

The gas inlet of the centrifugal separator may be arranged through the upper end wall or through the surrounding side wall close to the upper end wall, thus at the top of the separator, such that gas entering through the gas inlet is directed to the separation space. The downstream portion of the gas inlet may be centered around the axis of rotation (X). The gas inlet may further comprise upstream portion in the form of an inlet conduit. This conduit may extend radially or axially from the centrifugal separator.

The drainage outlet is arranged in the lower portion of the stationary casing, such as arranged in the lower end wall or in a lower portion of the surrounding side wall. Thus, the drainage outlet may be arranged centrally in an end wall opposite the end wall through which, or at which, the inlet is arranged. The drainage outlet of the centrifugal separator may further be formed by several spot shaped through holes of the stationary casing or by a single drainage passage. The drainage outlet may be arranged at the axis of rotation or centered around the axis of rotation. The drainage outlet may also be in an annular collection groove at the inner end wall of the stationary casing.

The gas outlet may be in the form of a gas conduit in through a wall of the stationary casing, such as in a lower portion of the surrounding side wall of the stationary casing. However, the gas outlet may also be arranged an upper portion of the stationary casing.

The rotating member is arranged for rotation during operation by means of the drive member. The rotating member comprises a plurality of separation members arranged in the separation space. The separation members of the rotating member are examples of surface-enlarging inserts that promote separation of contaminants from the gas. The separation members may be a stack of separation discs. The separation discs of the stack may be frustoconical. A frustoconical disc may have a planar portion extending in a plane that is perpendicular to the axis of rotation, and a frustoconical portion that may extend upwards or downwards. The planar portion may be closer to the rotational axis than the frustoconical portion. Further, the discs of the stack may be radial discs, in which substantially the whole disc extends in a plane that is perpendicular to the axis of rotation.

It is also to be understood that the separation members, such as separation discs, not necessarily have to be arranged in a stack. The separation space may for example comprise axial discs, or plates that extend around the axis of rotation. The axial discs or plates may be planar, i.e. extending in planes that are parallel to the axis of rotation. The axial discs or plates may also have a slightly or significantly curved shape, such as an arcuate or spiral shape, as seen in a radial plane.

The rotating member is journaled within the stationary casing by at least one bearing, such as by at least two bearings. Each of the bearings may be retained in an individual bearing holder.

During operation, gas to be cleaned may be directed centrally through the plurality of separation members, such as centrally through the stack of separation discs. In such a set-up, the rotating member may further define a central space formed by at least one through hole in each of the separation members. This central space is connected to the gas inlet and configured to convey the gas to be cleaned from the gas inlet to the interspaces between the separation members, such as between the interspaces between the discs of a stack of separation discs. A separation disc that may be used as separation member may comprise a central, essentially flat portion perpendicular to the axis of rotation. This portion may comprise the through holes that form parts of the central space.

Thus, the centrifugal separator may be configured to lead gas to be cleaned, such as crankcase gases, from the gas inlet into a central portion of the rotating member. In this manner the crankcase gases may be "pumped" from the central portion of the rotating member into the interspaces between the separation discs in the stack of separation discs by the rotation of the rotating member. Thus, the centrifugal separator may work according to the concurrent flow principle, in which the gas flows in the disc stack from a radial inner part to a radial outer part, which is opposite to a separator operating according to the counter-current flow principle, in which the gas is conducted into the centrifugal rotor at the periphery of the rotor and is led towards a central part of the rotor.

The drive member may for example comprise a turbine wheel, rotated by means of an oil jet from the lubrication oil system of the combustion engine or a free jet wheel comprising a blow-back disk. However, the drive member may also be independent of the combustion engine and comprise an electrical motor, a hydraulic motor or a pneumatic motor. The drive member may be arranged axially below the separation chamber.

According to the centrifugal separator of the first aspect of the invention, there is also at least one guiding vane arranged for guiding separated liquid impurities on the inner surface of the lower end wall from a radial outer position to the drainage outlet.

Moreover, the centrifugal separator further comprises a radial disc element arranged on top of the at least one guiding vane. The radial disc element may thus be a stationary disc during operation of the separator. The radial disc element does not extend radially all the way to the inner surface of the surrounding side wall, but leaves a small passage, an annular channel, for separated liquid impurities. Thus, separated oil that flows due to gravity down on the inner surfaces of the surrounding side wall may pass the annular channel down to the at least one guiding vane.

The first aspect of the invention is based on the insight that the radial disc element arranged a top of the guiding vane or guiding vanes increases the stiffness of the separator substantially. This is partly due to the disc element being arranged with a distance from the lower end wall, so that it is not directly heated by warm oil that may be present in a drive chamber below the separation space. Thus, with a radial disc element as in the first aspect of the invention, one or several portions of the centrifugal separator, such as the rotating member or parts of the stationary casing, may be of a polymeric material.

Moreover, the separator of the first aspect of the invention facilitates a compact structure of the centrifugal separator. This is due to the protected oil drainage created by the radial disc element that provides for arranging the separation members axially close to the lower end wall of the stationary casing. Thus, the circulating gas stream caused by the rotating portion may be prevented from negatively affecting oil drainage from a radial outer position of the casing, such as at the surrounding side wall, to the drainage outlet arranged at a radial inner position. In other words, the radial disc element creates dam area for the liquid impurities as they are drained from the surrounding side wall to the oil drainage.

In embodiments, the distance between the lowermost portion of the separating members and the inner surface of the lower end wall is less than 40 mm, such as less than 30 mm. As an example, the distance between the lowermost portion of the separating members and the inner surface of the lower end wall may be between 5 and 40 mm, such as between 5 and 30 mm. If the separating members is a stack of separation discs, the lowermost portion of the separating members may be at the outer radius of the lowermost separation disc of the disc stack.

In embodiments of the first aspect, the radial disc element, the lower end wall and the at least one guiding vane form a sandwich structure. Thus, the radial disc element and the lower end wall may form facings that carry the bending loads, such as tension and compression, whereas the at least one guiding vane form the core of the sandwich structure that carries the shear load.

In embodiments of the first aspect, the at least one guiding vane extends axially up from the inner surface of the lower end wall. Thus, the guiding vane or vanes may form protrusions from the inner surface of the lower end wall. The guiding vane may be a part of the lower end wall of the stationary casing. Thus, the guiding vane or guiding vanes, together with the lower end wall, may be a single piece unit.

In embodiments of the first aspect, the at least one guiding vane extends axially down from the radial disc element. Thus, the radial disc element and the guiding vane or vanes may be formed as a single-piece unit.

In embodiments of the first aspect, the radial disc element extends on top of the at least one guiding vane such that a plurality of individual drainage channels are formed between the lower end wall and the radial disc element. The individual drainage channels may extend from a radial outer position to the drainage outlet arranged at radial inner position.

Consequently, the least one guiding vane together with the radial disc element and the inner surface of the bottom end wall may form drainage channels for separated liquid impurities. As an example, at least two, such as at least three, individual drainage channels may be formed on the lower end wall. The individual drainage channels may tilt radially inwards to the drainage outlet to facilitate transport and drainage of the liquid impurities. Due to the radial disc element forming a "roof" of the drainage channels, liquid impurities in these channels may be shielded from the circulating gas stream axially above the radial disc element. Further, the radial disc element may function as a divider for the gas stream so that the gas moves radially outwards above the radial disc element (due to the rotational separation members) and radially inwards below the radial disc element, thereby aiding in transporting oil towards a drainage outlet.

In embodiments of the first aspect, the radial disc element is welded on top of the at least one guiding vane. If the radial disc element and the guiding vanes are of plastic, the radial disc element and the guiding vanes may be joined by any type of external or internal heating method for welding thermoplastics together. The radial disc element and the guiding vanes may also be formed by 2K molding.

The at least one guiding vane may be at least two, such as at least three, such as at least four guiding vanes.

In embodiments of the first aspect, the at least one guiding vane is curved. The at least one guiding vane may thus be curved as seen in the radial plane, i.e. form an angle with the radial direction. Thus, the guiding vane may be spiral shaped or arcuate as seen in a radial plane. The spiral shaped guiding vane may form a continuous or gradually widening curve from a central portion of the inner surface of the lower end wall. Curved guiding vanes, as seen radially outwardly, may be directed forwardly in the intended direction r of rotation during use of the centrifugal separator. This may aid in guiding the oil to the drainage outlet in case the separator is tilted. However, curved guiding vanes may also be directed backwardly in the intended direction r of rotation during use of the centrifugal separator.

In embodiments of the first aspect, the at least one guiding vane is straight. The guiding vane may be straight in the radial direction or be straight and form an angle with the radial direction.

In embodiments of the first aspect, the drainage outlet is arranged in a central portion of the lower end wall. The drainage outlet may for example be formed by a plurality of through holes spaced around the axis of rotation (X). The inner surface of the lower end wall may be tilted radially inwards to the central portion and the drainage outlet.

As an example, the rotating member may be journaled within the stationary casing via an upper and lower bearing arranged axially on separate sides of the separation members. The drainage outlet may then be arranged such that separated liquid impurities are drained through the lower bearing. This may facilitate lubrication of the lower bearing.

In embodiments of the first aspect, the radial disc element has a radial extension that is at least the radial extension of the plurality of separation members.

Thus, the annular channel formed between the radial disc element and the inner surface of the surrounding side wall of the stationary casing may have a width that is less than the distance from the radially outermost portion of the separation members to the inner surface of the surrounding side wall. Thus, the radial disc element may extend to a position that is at least 50%, such as at least 75%, such as at least 90%, such as at least 95%, of the radial distance of the separation space. The formed annular channel for separated liquid impurities at the inner surface of the surrounding side wall may have a width (i.e. extend radially) that is less than 10 mm, such as less than 5 mm.

In embodiments of the first aspect, the bottom end wall, the at least one guiding vane and the radial disc element are of a polymeric material. As discussed above, due to the stability and stiffness created by the radial disc element, one or several of the radial disc element, the bottom end wall of the stationary casing and the rotating member may be of a polymeric material, such as plastics. This may facilitate production of the centrifugal separator.

In embodiments of the first aspect, the gas outlet is arranged on the upper half of the stationary casing. As an example, the gas outlet may be arranged in the upper portion of the surrounding side wall of the stationary casing or arranged in the upper end wall of the stationary casing.

In embodiments of the first aspect, the drive member is a turbine wheel configured to be rotated by means of an oil jet from the lubrication oil system of a combustion engine. As mentioned above, it may then be an advantage to use the radial disc element, since this may not be in direct contact with any drive chamber with warm oil.

In embodiments of the first aspect, the plurality of separation members is a stack of separation discs, such as a stack of frustoconical separation discs. Such discs may have an outer radius and an inner radius, thus forming a central opening in the disc. The frustoconical separation discs may comprise a flat portion that extend perpendicularly to the axis of rotation (X), and a conical portion that extend outwardly and downwardly from the flat portion. Opening is the flat portion may for part of a central space within the centrifugal separator into which gas to be cleaned is guided from the gas inlet. Thus, gas to be cleaned may be guided into the central space and then to the interspaces formed between the discs in the disc stack. As a complement, or alternative, the central space may also be formed radially within the inner radius of the discs.

As a second aspect of the invention, there is provided a method for cleaning gas containing contaminants, the method comprising
- guiding gas containing contaminants to a centrifugal separator according to the first aspect above during rotation of the rotating member,
- discharging cleaned gas from the gas outlet, and
- discharging contaminants from the drainage outlet.

The contaminants in the gas may comprise liquid contaminants, such as oil, and soot.

This aspect may generally present the same or corresponding advantages as the former aspect. Effects and features of the second aspect are largely analogous to those described above in connection with the first aspect. Embodiments mentioned in relation to the first aspect are largely compatible with the second aspect.

The inventor has also realized that only having guiding vanes and not the radial disc element may still give some beneficial effect. Thus, as an additional aspect of the invention, there is provided a centrifugal separator for cleaning gas containing contaminants comprising
- a stationary casing enclosing a separation space through which a gas flow is permitted, said stationary casing comprising a surrounding side wall, an upper end wall and a lower end wall,
- a gas inlet extending through the stationary casing and permitting supply of the gas to be cleaned,
- a rotating member comprising a plurality of separation members arranged in said separation space and being arranged to rotate around an axis (X) of rotation;
- a gas outlet arranged in the stationary casing and configured to permit discharge of cleaned gas and comprising an outlet opening through a wall of the stationary casing,
- a drainage outlet arranged in a lower portion of the stationary casing and configured to permit discharge of liquid contaminants separated from the gas to be cleaned;
- a drive member for rotating the rotating member;
- wherein the centrifugal separator further comprises at least one guiding vane arranged for guiding separated liquid impurities on the inner surface of the lower end wall from a radial outer position to the drainage outlet.

All features of this aspect are the same as disclosed in relation to the first aspect above. Thus, the centrifugal separator of this additional aspect may be the same as the centrifugal separator of the first aspect, except for not having the radial disc element.

During operation, the rotation of the disc stack may create a rotational gas flow which is bringing oil around in a circular motion in the stationary casing, even at inclination. By using only the guiding vanes the separated oil may still be guided in the slots between the vanes and be drained through the drainage outlet even at high inclination. The guiding vanes are thus providing a low-pressure zone where oil may accumulate and pour towards the drainage outlet. The guiding vanes themselves further adds strength to the stationary casing.

The guiding vanes may thus extend axially upwards from the inner surface of the lower end wall.

The guiding vanes may be straight or curved as seen in the radial plane. Further, a guiding vane may have the same axial height throughout its radial extension, or the axial height may vary. As an example, the axial height may be larger in a radial middle portion of the guiding vane as compared to the radial inner and radial outer portions. The guiding vane may thus be curved as seen in the axial plane.

As an example, the centrifugal separator may comprise at least four guiding vanes, such as at least eight, such as at least twelve, such as at least sixteen guiding vanes.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

The centrifugal separator according to the present disclosure will be further illustrated by the following description with reference to the accompanying drawings.

Figure 1:
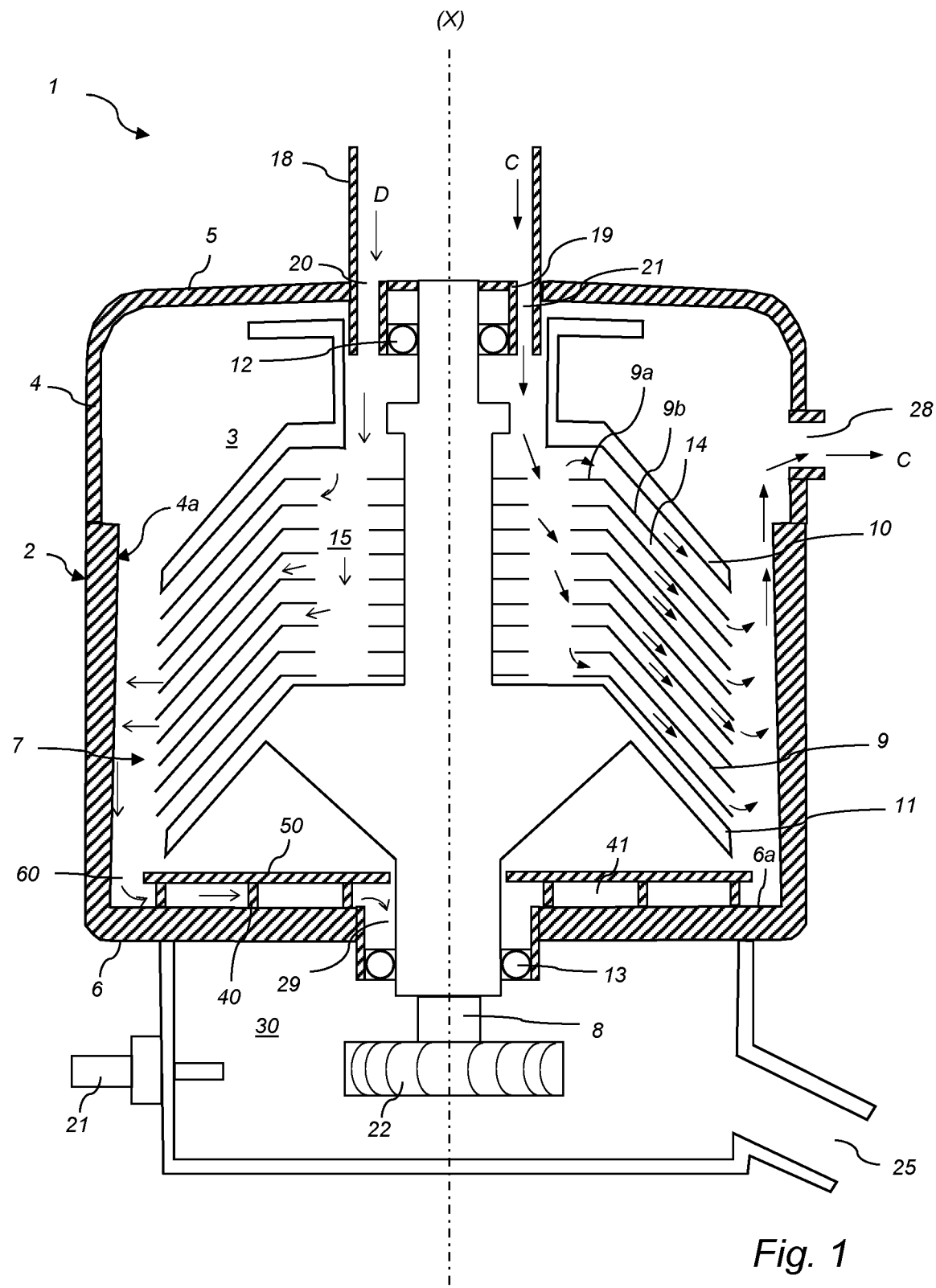
FIG. 1 shows a schematic drawing of the cross-section of an embodiment of a centrifugal separator for cleaning gas.

FIG. 1 shows a cross-section of a centrifugal separator 1 according to the present disclosure. The centrifugal separator 1 comprises a stationary casing 2, which is configured to be mounted to a combustion engine (not disclosed), especially a diesel engine, at a suitable position, such as on top of the combustion engine or at the side of the combustion engine.

It is to be noted that the centrifugal separator 1 is also suitable for cleaning gases from other sources than combustion engines, for instance the environment of machine tools which frequently contains large amounts of liquid contaminants in the form of oil droplets or oil mist.

The stationary casing 2 encloses a separation space 3 through which a gas flow is permitted. The stationary casing 2 comprises, or is formed by, a surrounding side wall 4, an upper end wall 5 and a lower end wall 6.

The centrifugal separator comprises a rotating member 7, which is arranged to rotate around an axis (X) of rotation. It should be noted that the stationary casing 2 is stationary in relation to the rotating member 7, and preferably in relation to the combustion engine to which it may be mounted.

The stationary casing 2 has a radius from the axis (X) of rotation to the surrounding side wall 4 that is constant at least with respect to a major part of the circumference of the surrounding side wall 4. The surrounding side wall 4 thus has a circular, or substantially, circular cross-section.

The rotating member 7 comprises a spindle 8 and a stack of separation discs 9 attached to the spindle 8. All the separation discs of the stack 9 are provided between a top disc 10 and a lower end plate 11 within the separation space 3.

The spindle 8, and thus the rotating member 7, is rotatably supported in the stationary casing 2 by means of an upper bearing 12 and a lower bearing 13, the bearings being arranged one on each axial side of the stack of separation discs 9.

The separation discs of the disc stack 9 are frusto-conical and extend outwardly and downwardly from the spindle 8. The separation discs thus comprise a flat portion 9a, which extend perpendicularly to the axis of rotation (X), and a conical portion 9b, that extend outwardly and downwardly from the flat portion 9a.

It should be noted that the separation discs also could extend outwardly and upwardly, or even radially.

The separation discs of the stack 9 are provided at a distance from each other by means of distance members (not disclosed) in order to form interspaces 14 between adjacent separation discs 9, i.e. an interspace 14 between each pair of adjacent separation discs 9. The axial thickness of each interspace 14 may e.g. be in the order of 1-2 mm.

The separation discs of the stack 9 may be made of plastic or metal. The number of separation discs in the stack 9 is normally higher than indicated in FIG. 1 and may be for instance 50 to 100 separation discs depending on the size of the centrifugal separator.

The centrifugal separator 1 comprises an oil nozzle 21 arranged for being connected to an engine oil circuit of an internal combustion engine. During running of the internal combustion engine, oil is pumped through the oil nozzle 21 onto a wheel 22 connected to the spindle 8 to thereby rotate the rotating member 7 and thus the stack of separation discs 9. The turbine wheel 22 is arranged in a drive chamber 30 arranged axially below the separation space 3.

As an alternative, the centrifugal separator 1 may comprise an electric motor arranged to rotate the spindle 8 and rotating member 7. As a further alternative, the centrifugal separator 3 may comprise a turbine wheel connected to the spindle 8, where the turbine wheel is arranged to be driven by exhaust gases from the internal combustion engine to rotate the spindle 8 and the rotating member 7. The rotating member 7 may also be arranged for being rotated by a mechanical drive unit. Thus, the centrifugal separator may comprise a mechanical drive unit for rotating the rotating member.

The rotating member 7 defines a central space 15 within the separation space 3. The central space 15 is formed by a through hole in each of the separation discs of the stack 9. In the embodiments of FIG. 1, the central space 15 is formed by a plurality of through holes, each extending through the top disc 10 and through each of the separation discs, but not through the lower end plate 11. The through holes are arranged in the flat portions 9a of the separation discs.

The gas inlet 20 is for the supply of the gas to be cleaned. The gas inlet 20 extends through the stationary casing 2, and more precisely through upper end wall 5. The gas inlet 20 is formed by the axially extending inlet conduit 18, which forms an upstream portion, and through channels 21 that form a downstream portion of the inlet 20. The through channels 21 are arranged radially outside the upper bearing 12, through which the inlet conduit 18 communicates with central space 15.

The gas inlet 20 communicates with the central space 15 so that the gas to be cleaned is conveyed from the inlet 20 via the central space 15 to the interspaces 14 of the stack of separation discs 9. The gas inlet 20 is configured to communicate with the crankcase of the combustion engine, or any other source, via the inlet conduit 18 permitting the supply of crankcase gas from the crankcase to the gas inlet 20 and further to the central space 15 and the interspaces 14 as explained above.

The centrifugal separator 1 comprises a drainage outlet 29 arranged in the lower portion of the separation space 3 and configured to permit discharge of liquid contaminants separated from the gas. The drainage outlet 29 is in this embodiment in the form of through holes arranged in the lower end wall 6 so that separated liquid contaminants flow through the lower bearing 13 as they are drained from the separation space 3. The separated oil, and other particles and/or substances, is led to an oil outlet 25 of the centrifugal separator 1, which together with oil from the oil nozzle 21 used to drive the wheel 22, may be led back to the engine oil circuit of an internal combustion engine.

The gas outlet 28 of the centrifugal separator 1 is in this example arranged in the upper portion of the stationary casing 2 and is configured to permit discharge of cleaned gas. The gas outlet 28 comprises an outlet conduit through the surrounding side wall 4 of the stationary casing 2. The gas outlet 28 is in this embodiment arranged in the upper portion of the surrounding side wall 4, but the gas outlet 28 could also be arranged in the upper end wall 5.

During operation of the centrifugal separator as shown in FIG. 1, the rotating member 7 is kept in rotation by the oil nozzle 21 supplying oil against the wheel 22. As an example, the rotational speed may be in the range of 7.500-12.000 rpm.

Contaminated gas, e.g. crankcase gas from the crankcase of an internal combustion engine, is supplied to the gas inlet 20 via conduit 18. This gas is conducted further into the central space 15 and from there into and through the interspaces 14 between the separation discs of the stack 9. As a consequence of the rotation of the rotating member 7 the gas is brought to rotate, whereby it is pumped further on radially outwardly through gaps or interspaces 14.

During the rotation of the gas in the interspaces 14, solid or liquid particles such as oil suspended in the gas are separated therefrom. The particles settle on the insides of the conical portions 9b of the separation discs and slide or run after that radially outwardly thereon. When the particles and/or liquid drops have reached out to the radial outer edges of the separation discs 9, they are thrown away from the rotating member 7 and hit the inner surface 4a of the surrounding side wall 4. Separated oil particles may form a film on the inner surface 4a of the stationary casing 2. From there, oil may be pulled by gravity downwardly to bottom end wall 6 and then and leave the separation space 3 through the drainage outlet 29. For this, the inner wall 6a of the bottom end wall may be tilted radially inwards, so that oil leaving the surrounding inner wall of the stationary casing 2 may be pulled by gravity towards drainage outlet 29. The path of the contaminants in the gas is schematically illustrated by arrows "D" in FIG. 1.

Cleaned gas freed from particles and exiting from the stack 9 of separation leaves the stationary casing 2 through the gas outlet 28. The path of the gas through the centrifugal separator 1 is schematically shown by arrows "C" in FIG. 1.

The lower end wall 6 of the stationary casing 2 further comprises a plurality of guiding vanes, 40 that extend axially up from the inner surface 6a of the lower end wall. The guiding vanes 40 thus form protrusions from the inner surface 6a of the lower end wall 6, and are arranged for guiding separated liquid impurities, such as oil, from a radial outer position to the drainage outlet 29. In other words, oil that is pulled down by gravity on the inner surface 4a of the surrounding side wall 4 is further guided on the inner surface 6a of the bottom end wall by the guiding vanes to the drainage outlet 29. The guiding vanes are in this example curved and are seen in more detail in FIGS. 2 and 3. The drainage outlet 29 is arranged in a central portion of the lower end wall 6, and in this example arranged such that separated liquid impurities are drained through the lower bearing 13.

There is further a radial disc element 50 arranged on top of the guiding vanes guiding vane 40, so that the radial disc element 50, the lower end wall 6 and the guiding vanes 40 form a sandwich structure, as seen in the axial plane. This thus gives a robust and more stiff structure, thereby providing for at least one or all of the bottom end wall 6, the guiding vanes 40 and the radial disc element 50 to be made of a polymeric material, such as plastics, and still give the whole centrifugal separator 1 an overall stiff structure so that it may be used in the harsh and warm environment at an engine or engine block. In this example, the radial disc element 50 is welded on top of the guiding vanes 40.

Further, since the radial disc element 50 does not extends radially in the separation space all the way out to the inner surface 4a of the surrounding side wall 4, i.e. to a position that is radially inwards from the surrounding side wall 4, an annular channel 60 for separated liquid impurities is formed at the inner surface 4a of the surrounding side wall 4. Due to the radial disc element 50, a calm zone is formed for separated liquid impurities in the formed sandwich structure. This means that separated oil that is guided on the lower end wall is shielded from the circulating gas above the radial disc element 50.

Figure 2:
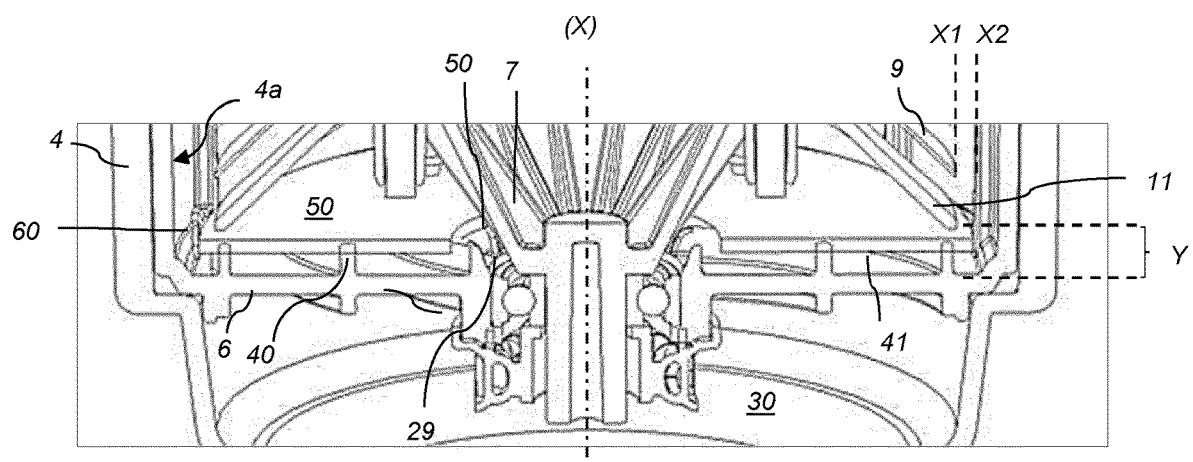
FIG. 2 shows a close-up view of the bottom end wall of the centrifugal separator of FIG. 1.
Figure 3:
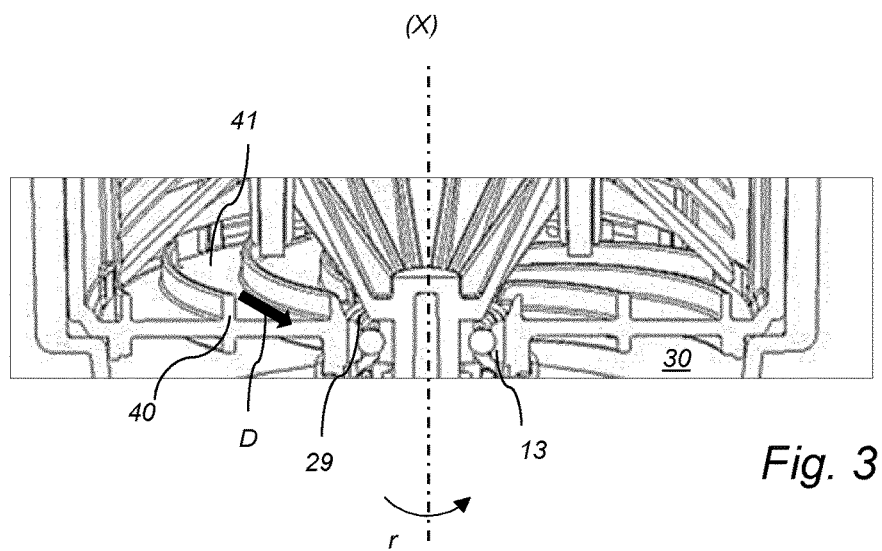
FIG. 3 shows a close-up view of the bottom end wall as in FIG. 2, but in which the radial disc element has been removed.

FIG. 2 and FIG. 3 show the radial disc element 50 and the formed sandwich structure in more detail. FIG. 3 is the same as FIG. 2, but in which the radial disc element 50 has been removed to further visualize the individual drainage channels 41. Thus, as seen in FIGS. 2 and 3, the radial disc element 50 extends on top of the guiding vanes 40 such that a plurality of individual drainage channels 41 are formed on the lower end wall 6. The individual drainage channels 41 extend from a radial outer position to the drainage outlet 29 arranged at radial inner position. The separated oil may thus be guided in the individual drainage channels 41, as illustrated by arrow "D" in FIG. 3, and thereby be prevented from re-entering the circulating gas axially above the radial disc element.

As seen in the perspective vies of FIGS. 2 and 3, the least one guiding vane 40 is curved as seen in the radial plane. This means that the formed guiding channels 41 also are curved or spiral-shaped. The curved guiding vanes 40, as seen radially outwardly, is in this example directed backwardly in the intended direction r of rotation during use of the centrifugal separator 1.

However, the guiding vane or guiding vanes 40 could also be straight, such as straight in the radial direction or straight and forming an angle with the radial direction, and still be able to form the sandwich structure together with the radial disc element 50 and the lower end wall 6.

The guiding vane or vanes 40 could be shaped such that the formed guiding channels 41 become thinner as it extends radially inwards.

The radial disc element 50 is arranged close to the bottom end wall 6, which allows for a compact separator structure. The radial disc element has a central through hole 51 through which the rotating member 7 extends. Further, the radial disc element 50 has a radial extension that is at least the radial extension of the disc stack 9. As illustrated in FIG. 2, the disc stack 9 extends to a radial position X1, whereas the radial disc element 50 extends to a radial position X2, wherein X2 is larger than X1. This provides for a radially thin annular channel 60 between the radial disc element 50 and the inner surface 4a surrounding side wall 4.

Due to the radial disc element 50, the disc stack 9 may be arranged with a distance Y to the lower end wall 6 that is less than 40 mm, such as less than 30 mm, as illustrated in FIG. 2. However, the distance Y may be more than 5 mm, such as between 5-40 mm. The distance Y is thus the axial distance between the radially outermost portion of the lower end plate 11 and the bottom end wall 6.

Thus, the radial disc element may be arranged with a distance of between 5-40 mm, such as between 10-30 mm to the lower end wall.

Further, the radial disc element 50 may have a thickness that is between 1-3 mm.

Figure 4:
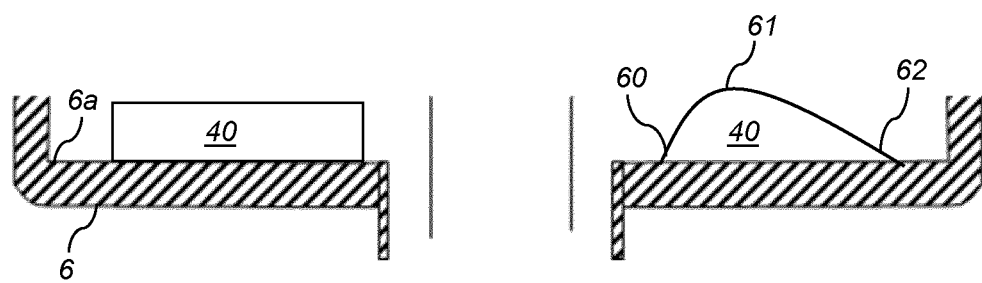
FIG. 4 shows an additional embodiment in which the centrifugal separator has guiding vanes but no radial disc element.

As discussed in the relation to the additional aspect above, there may be beneficial effects in having only the guiding members and not any radial disc element. Such an embodiment is disclosed in FIG. 4, which shows the lower end wall 6 of the stationary casing of the centrifugal separator 1. There are guiding vanes 40 extending from the inner surface 6a of the lower end wall 6 of the stationary casing. FIG. 4 shows two examples of guiding vanes 40 being straight in the radial direction. On the left side of FIG. 4, the guiding vane 4 has the same axial height throughout the radial length. On the right side, the guiding vane 40 has an axial height that varies throughout the radial extension of the vane. The guiding vane 40 has a radial inner portion 60 and a radial outer portion 62. The radial middle portion 61, thus arranged radially between the inner portion 60 and the outer portion 62, has an axial height that is higher than the inner and outer portions. However, the axial cross section is still smooth, i.e. slightly curved as seen in the axial plane.

Figure 5:
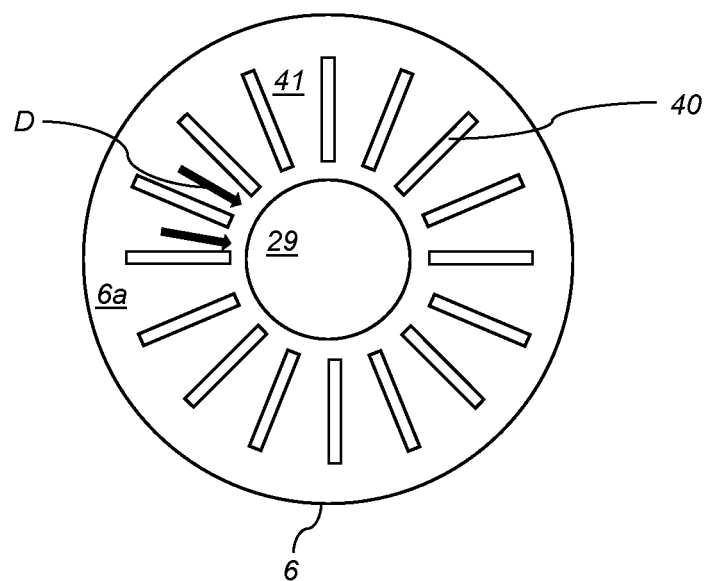
FIG. 5 shows a top view of the lower end wall of the stationary casing of the embodiment shown in FIG. 4.

FIG. 5 shows a top view of the inner surface 6a of the lower end wall 6. The guiding vanes 40 thus creates lower pressure zones 41 in between the vanes 40 so that the separated oil at the bottom of the centrifugal separator may be poured out via the drainage outlet 29, as indicated by arrows "D". The guiding vanes 40 shown in FIGS. 4 and 5 are all straight as seen in the radial plane. However, the guiding vanes may also be curved in the radial plane, as shown in relation to FIGS. 1-3 above.

The invention is not limited to the embodiment disclosed but may be varied and modified within the scope of the claims set out below. The invention is not limited to the orientation of the axis of rotation (X) disclosed in the figures. The term "centrifugal separator" also comprises centrifugal separators with a substantially horizontally oriented axis of rotation. In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A centrifugal separator for cleaning gas containing contaminants comprising:
   a stationary casing, enclosing a separation space through which a gas flow is permitted, said stationary casing comprising a surrounding side wall, an upper end wall and a lower end wall;
   a gas inlet extending through the stationary casing and permitting supply of the gas to be cleaned;
   a rotating member comprising a plurality of separation members arranged in said separation space and being arranged to rotate around an axis of rotation;
   a gas outlet arranged in the stationary casing and configured to permit discharge of cleaned gas and comprising an outlet opening through a wall of the stationary casing;

a drainage outlet arranged in a lower portion of the stationary casing and configured to permit discharge of liquid contaminants separated from the gas to be cleaned;

a drive member for rotating the rotating member;

at least one guiding vane arranged for guiding separated liquid impurities on an inner surface of the lower end wall from a radial outer position to the drainage outlet; and a radial disc element arranged on top of the at least one guiding vane, wherein the radial disc element extends radially in the separation space to a position that is radially inwards from the surrounding side wall, thereby forming an annular channel for separated liquid impurities at an inner surface of the surrounding side wall.

2. The centrifugal separator according to claim 1, wherein the radial disc element, the lower end wall and the at least one guiding vane form a sandwich structure.

3. The centrifugal separator according to claim 1, wherein the at least one guiding vane extends axially up from the inner surface of the lower end wall.

4. The centrifugal separator according to claim 1, wherein the at least one guiding vane extends axially down from the radial disc element.

5. The centrifugal separator according to claim 1, wherein said radial disc element extends on top of the at least one guiding vane such that a plurality of individual drainage channels are formed between the lower end wall and the radial disc element, and wherein the individual drainage channels extend from a radial outer position to the drainage outlet arranged at a radial inner position.

6. The centrifugal separator according to claim 1, wherein the radial disc element is welded on top of the at least one guiding vane.

7. The centrifugal separator according to claim 1, wherein the at least one guiding vane is curved.

8. The centrifugal separator according to claim 1, wherein the at least one guiding vane is straight.

9. The centrifugal separator according to claim 1, wherein the drainage outlet is arranged in a central portion of the lower end wall.

10. The centrifugal separator according to claim 9, wherein said rotating member is journaled within the stationary casing via an upper and lower bearing arranged axially on separate sides of the plurality of separation members, and wherein the drainage outlet is arranged such that separated liquid impurities are drained through the lower bearing.

11. The centrifugal separator according to claim 1, wherein the radial disc element has a radial extension that is at least the radial extension of the plurality of separation members.

12. The centrifugal separator according to claim 1, wherein the lower end wall, the at least one guiding vane and the radial disc element are of a polymeric material.

13. The centrifugal separator according to claim 1, wherein the gas outlet is arranged on an upper half of the stationary casing.

14. The centrifugal separator according to claim 1, wherein the plurality of separation members is a stack of separation discs.

15. The centrifugal separator according to claim 1, wherein the drive member is a turbine wheel configured to be rotated by an oil jet from a lubrication oil system of a combustion engine or wherein the drive member is an electrical motor.

16. The centrifugal separator according to claim 2, wherein the at least one guiding vane extends axially up from the inner surface of the lower end wall.

17. The centrifugal separator according to claim 2, wherein the at least one guiding vane extends axially down from the radial disc element.

18. The centrifugal separator according to claim 2, wherein said radial disc element extends on top of the at least one guiding vane such that a plurality of individual drainage channels are formed between the lower end wall and the radial disc element, and wherein the individual drainage channels extend from a radial outer position to the drainage outlet arranged at a radial inner position.

19. The centrifugal separator according to claim 3, wherein said radial disc element extends on top of the at least one guiding vane such that a plurality of individual drainage channels are formed between the lower end wall and the radial disc element, and wherein the individual drainage channels extend from a radial outer position to the drainage outlet arranged at a radial inner position.

20. The centrifugal separator according to claim 4, wherein said radial disc element extends on top of the at least one guiding vane such that a plurality of individual drainage channels are formed between the lower end wall and the radial disc element, and wherein the individual drainage channels extend from a radial outer position to the drainage outlet arranged at a radial inner position.

* * * * *